(12) United States Patent
Chen

(10) Patent No.: US 7,894,332 B2
(45) Date of Patent: Feb. 22, 2011

(54) POWER PROFILE RESHAPING IN ORTHOGONAL FREQUENCY DIVISION MULTIPLE ACCESS SYMBOLS

(75) Inventor: Jiangnan Jason Chen, Hawthorn Woods, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 909 days.

(21) Appl. No.: 11/769,152

(22) Filed: Jun. 27, 2007

(65) Prior Publication Data

US 2009/0003467 A1 Jan. 1, 2009

(51) Int. Cl.
*H04J 7/00* (2006.01)
*H04J 3/16* (2006.01)
*H04B 7/00* (2006.01)

(52) U.S. Cl. .................. 370/212; 370/465; 455/522
(58) Field of Classification Search .............. 370/212, 370/465; 455/522
See application file for complete search history.

(56) References Cited

U.S. PATENT DOCUMENTS

2006/0078059 A1 4/2006 Ok et al.

FOREIGN PATENT DOCUMENTS

| EP | 1534039 A2 | 5/2005 |
|---|---|---|
| EP | 1679932 A1 | 7/2006 |

*Primary Examiner*—Ronald Abelson

(57) ABSTRACT

A method, information processing system, and base station for reshaping power profiles in Orthogonal Frequency Division Multiple Access (OFDMA) symbols. The method includes monitoring a scheduler (116) at a base station (110) for a modulation and coding scheme selection. Determining that the scheduler (116) selected a modulation and coding scheme. Identifying at least one information element (220) within the symbol. Determining, in response to the identifying, a channel connection (210) associated with the at least one information element (220). Determining a channel condition associated with the channel connection (210). Reshaping a power profile associated with the one information element (220). The reshaping decreases power made available to the channel connection (210). Reshaping, in response to the channel condition being less than the channel condition threshold, the power profile associated with the at least one information element (220) so that power made available to the channel connection (210) is increased.

19 Claims, 10 Drawing Sheets

- PRIOR ART -

POWER PROFILE RESHAPING IN ORTHOGONAL FREQUENCY DIVISION MULTIPLE ACCESS SYMBOLS

FIELD OF THE INVENTION

The present invention generally relates to the field of wireless communications, and more particularly relates to reshaping power profiles in OFDMA Symbols.

BACKGROUND OF THE INVENTION

In a downlink ("DL") of an Orthogonal Frequency Division Multiple Access ("OFDMA") type of system, power control usually receives limited gain, although power control is still considered in various standards. In general, without continuous DL power control, equal power allocation to all OFDMA data sub-carriers in the DL direction is a very common practice in both academia and engineering fields, especially for wireless high speed data services.

However, there are areas such as control channels, downlink map ("DL-MAP") and uplink map ("UL-MAP") in 802.16d/e or alike, where worst case condition modulation and coding allocation is often assumed in order for the DL-MAP and UL-MAP to cover the whole cell site. With constant DL power and equal power allocation for all the sub-carriers within OFDMA symbols, signals going through different channel frequencies are carrying the same power for sub-carriers with the same modulation schemes. In the DL frame, the DL-MAP and UL-MAP include Information Elements ("IEs") for data bursts of all connections.

While these data bursts are allocated with different modulation and coding schemes based on their channel conditions, it is non-ideal for all the IEs in the DL-MAP and UL-MAP to be sent with the same modulation and coding scheme. This is because the channel conditions are different for different connections. There is a fixed portion of the overhead information within the DL-MAP and UL-MAP. For these fixed portions of the MAPs, worst case channel coding, modulation and repetition is appropriate. However, since the fixed and variable portions of the MAP contents are channel encoded into a single burst, reaching to different mobiles with different channel condition is not easily accomplished.

With an OFDM type system where single frequency reuse pattern is assumed, Partial Usage of Sub-Channels ("PUSC") is also assumed where the sub-carriers are uniformly interleaved across the target bandwidth. The sub-carriers are uniformly interleaved across the target bandwidth with the same coding and modulation scheme such as QPSK and ½ rate encoding. The control channel signals that arrive at a mobile station from two base stations, which mobile station is at a cell boundary, interfere with each other with a rough Signal to Noise Ratio ("SNR") about 0 dB. This is because the same sub-carriers are used for both base stations and they carry the same power output with similar path loss. For example, FIG. 8 illustrates a situation where the above referenced interference can occur. In FIG. 8, a wireless device 802 resides within an overlapped cell coverage region 804. As discussed above, the wireless device experiences interference when trying to communicate with one base station 806 because the other base station 808 is also transmitting at the same power with a similar path loss.

Therefore a need exists to overcome the problems with the prior art as discussed above.

SUMMARY OF THE INVENTION

Briefly, in accordance with the present invention, disclosed are a method, information processing system, and a base station for reshaping power profiles in Orthogonal Frequency Division Multiple Access (OFDMA) symbols. The method includes monitoring a scheduler at a base station for a modulation and coding scheme selection. Determining that the scheduler selected a modulation and coding scheme. Identifying at least one information element within the OFDMA symbol. Determining, in response to the identifying, a channel connection associated with the at least one information element. Determining a channel condition associated with the channel connection. Reshaping, in response to the channel condition being at least one of equal to and greater than a channel condition threshold, a power profile associated with the at least one information element, wherein the reshaping decreases power made available to the channel connection. Reshaping, in response to the channel condition being less than the channel condition threshold, the power profile associated with the at least one information element, wherein the reshaping increases power made available to the channel connection.

In another embodiment, an information processing system for reshaping power profiles in Orthogonal Frequency Division Multiple Access (OFDMA) symbols is disclosed. The information processing system includes a memory and a processor that is communicatively coupled to the memory. The information processing system also includes a power profile reshaping module that is communicatively coupled to the memory and processor. The power profile reshaping module is adapted to determine that a scheduler selected a modulation and coding scheme, identify at least one information element within the OFDMA symbol, determine, in response to the identifying, a channel connection associated with the at least one information element, determine a channel condition associated with the channel connection, reshape, in response to the channel condition being at least one of equal to and greater than a channel condition threshold, a power profile associated with the at least one information element, wherein the reshaping decreases power made available to the channel connection, and reshape, in response to the channel condition being less than the channel condition threshold, the power profile associated with the at least one information element, wherein the reshaping increases power made available to the channel connection.

In yet another embodiment, a base station in a wireless communications system for reshaping power profiles in Orthogonal Frequency Division Multiple Access (OFDMA) symbols is disclosed. The base station includes a memory and a processor that is communicatively coupled to the memory. The base station also includes a power profile reshaping module that is communicatively coupled to the memory and processor. The power profile reshaping module is adapted to determine that the scheduler selected a modulation and coding scheme, identify at least one information element within the OFDMA symbol, determine, in response to the identifying, a channel connection associated with the at least one information element, determine a channel condition associated with the channel connection, reshape, in response to the channel condition being at least one of equal to and greater than a channel condition threshold, a power profile associated with the at least one information element, wherein the reshaping decreases power made available to the channel connection, and reshape, in response to the channel condition being less than the channel condition threshold, the power profile associated with the at least one information element, wherein the reshaping increases power made available to the channel connection.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smart phone, a two-way radio, a two-way pager, a wireless messaging device, a laptop/computer, automotive gateway, residential gateway, and the like.

One advantage of the present invention is that power profiles of Information Elements ("IEs") for different connects can be reshaped and redistributed. The reshaping allows for connections with good channel conditions to receive their control channel IEs correctly and without excessive power over their required Signal to Noise Ratio ("SNR"). Reshaping power profiles also allows the connections at cell edges having bad channel conditions to receive their control channel IEs with increased SNR. The Bit Error Rate ("BER") is improved by utilizing the excessive power saved from IEs having better channel conditions. Additionally, other-cell or inter-cell interference is reduced as a result of reducing the excessive power for these IEs whose channel condition is better than those IEs at the cell edges.

Wireless Communications System

Figure 1:
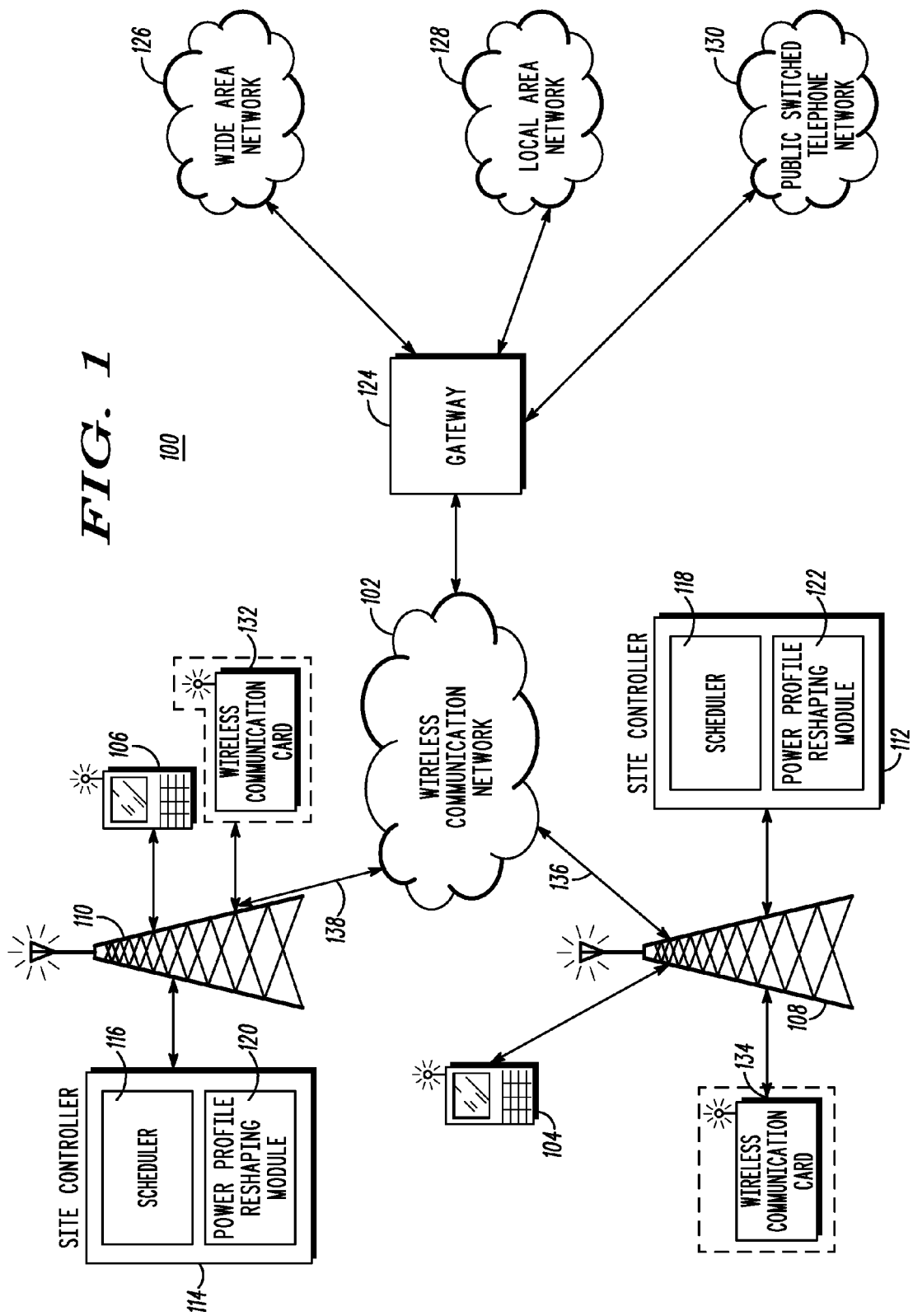
FIG. 1 is block diagram illustrating a wireless communications system according to an embodiment of the present invention.

According to an embodiment of the present invention, as shown in FIG. 1, a wireless communications system 100 is illustrated. FIG. 1 shows a wireless communications network 102 that connects wireless devices 104, 106, 132, 134 to other wireless devices and/or to other networks such as a wide area network 126, a local area network 128, a public switched telephone network 130, and the like via a gateway 124. The wireless communications network 102 comprises a mobile phone network, a mobile text messaging device network, a pager network, a wireless broadband data network, and/or the like.

Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like. Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices and wireless broadband communications.

The wireless network 102 supports any number of wireless communication devices 104, 106, 132, 134. The support of the wireless network 102 includes support for mobile telephones, smart phones, text messaging devices, handheld computers, pagers, beepers, wireless communication cards, personal computers with wireless communication adapters, or the like. A smart phone is a combination of 1) a pocket PC, handheld PC, palm top PC, or Personal Digital Assistant (PDA), and 2) a mobile telephone. More generally, a smart phone can be a mobile telephone that has additional application processing capabilities.

In one embodiment, the wireless communications network 102 is capable of broadband wireless communications utilizing time division duplexing ("TDD") as set forth, for example, by the IEEE 802.16d/e standard. The IEEE 802.16d/e standard is further described in IEEE Std. 802.16d/e 2005. The duplexing scheme TDD allows for the transmissions of signals in a downstream and upstream direction using a single frequency. It should be noted that the present invention is not limited to an 802.16d/e system for implementing TDD. Other communication systems that the present invention may be applied to include UMTS LTE, 802.20 systems, and the like. Other such standards such as UMTS LTE (Long Term Evolution) and IEEE 802.20 are also applicable. Furthermore, the wireless communications system 100 is not limited to a system using only a TDD scheme. For example, TDD may be only used for a portion of the available communication channels in the system 100, while one or more schemes are used for the remaining communication channels.

The wireless communications system 100 also includes multiple base stations 108, 110. The base stations 108, 110, in one embodiment, are connected to the wireless communication network 102 via an Ethernet connection 136, 138. However, it should be noted that other communication standards can be used. Each base station 108, 110 includes a site controller 112, 114. However, in another embodiment of the present invention, a site controller 112, 114 may be separate from, and coupled to, a corresponding base station 108, 110. Each base station 108, 110/site controller 112, 114 includes, in one embodiment, a scheduler 116, 118 for scheduling the transmission/reception of wireless data between wireless devices 104, 106, 132, 134 and their corresponding base station 108, 110. The scheduler 116, 118 is discussed in greater detail below. Each base station 108, 110/site controller 112, 114 also includes a power profile reshaping module 120, 122 that reshapes and redistributes the power profile within an OFDMA symbol based on the scheduler's 116, 118 selection of modulation and coding scheme. The power profile reshaping module 120, 122 is discussed in greater detail below. When a site controller 112, 114 is separate from, and coupled to, a corresponding base station 108, 110, the functionality of the scheduler 116, 118 and the power profile reshaping module 120, 122 may reside in the site controller, or the base station, or may be distributed between the site controller and the base station.

The wireless communication devices 104, 106, 132, 134 in one embodiment, are capable of wirelessly communicating data using the 802.16d/e standard or any other communication scheme that supports TDD. In another embodiment, the wireless communication devices 104, 106, 132, 134 are capable of wireless communications using other access schemes in addition to TDD.

Access Frame

Figure 2:
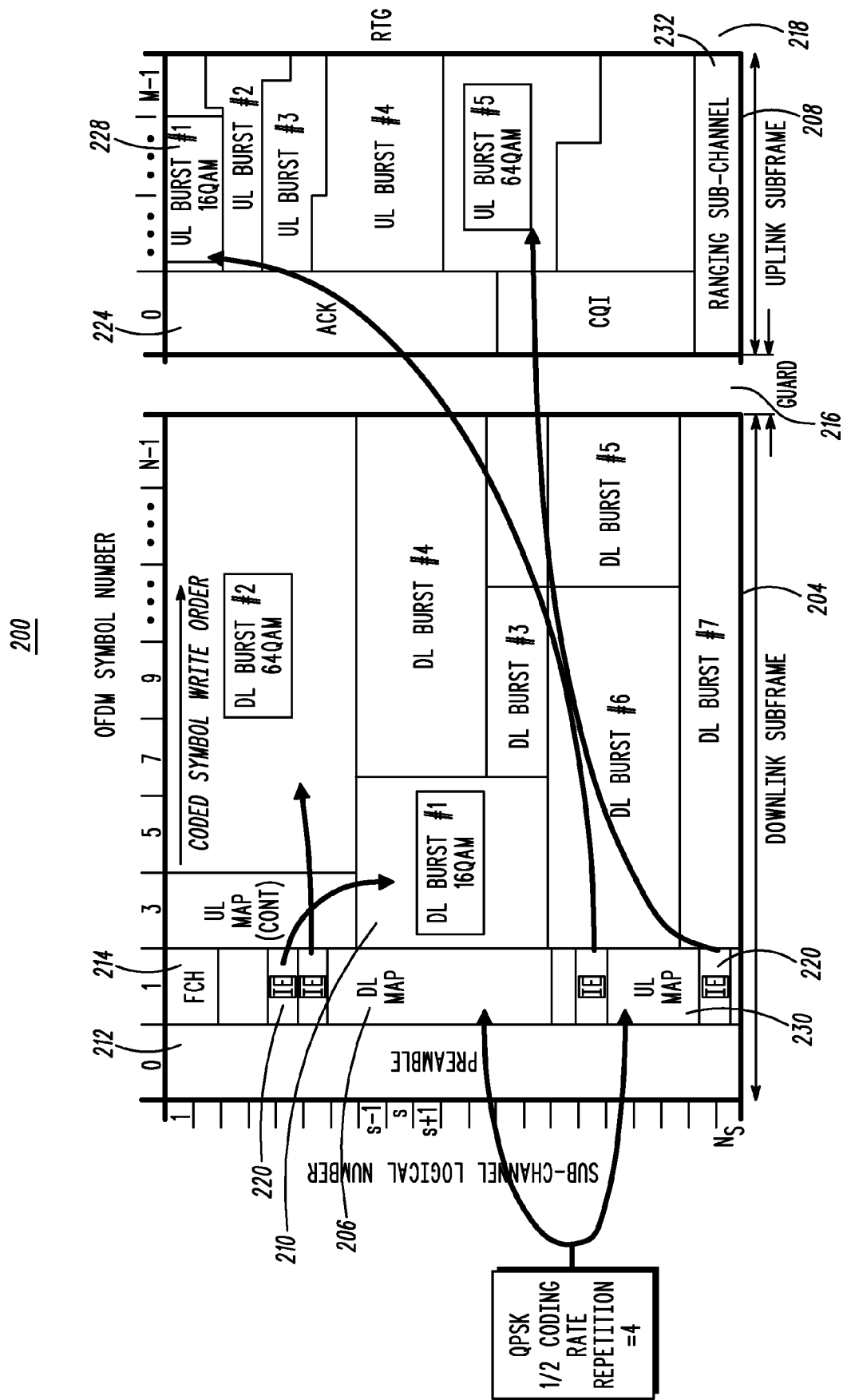
FIG. 2 is a diagram illustrating an example of an Access frame for an OFDMA system according to an embodiment of the present invention.

FIG. 2 depicts an exemplary Access frame 200 for an 802.16d/e system where a downlink sub-frame 204 and an uplink sub-frame 206 have been segmented. The downlink sub-frame 204 has two dimensions, which are time (symbols, e.g., 23 symbols) and frequencies (tones). It should be noted that the present invention is not limited to these symbols or a fixed symbol time.

A particular wireless communication device can be assigned to a symbol and/or tones within the time-frequency space of the downlink sub-frame 204. For example, the base station 110 transmits a downlink map ("DL-MAP") 206 to each wireless communication device 106, 132 serviced by the base station. Each wireless communication device 106, 132 uses the DL-MAP 206 to identify which symbol(s) it has been assigned for receiving data from the base station 110. In other embodiments, the DL-MAP 206 is used to identify the symbols and tones that the wireless communication device has been assigned to. In other words, the DL-MAP 206 identifies when a base station 110 is going to transmit to that particular wireless communication device. The base station 110 also transmits an uplink map ("UL-MAP") 230 via a downlink to the wireless communication devices 106, 132.

The downlink, in one embodiment, has 30 sub-channels (uplink can have 35 sub-channels), which are groups of tones. The UL-MAP 230 identifies which sub-channel and slots a particular wireless communication device is assigned and the modulation and coding scheme to be used for that sub-channel. A slot, in one embodiment, is N tones by M symbols and multiple slots can be allocated to a single burst. This is true for both the uplink and downlink maps. However, the N and M might be different for DL and UL.

The downlink sub-frame 204 of the Access frame 200 also includes a plurality of downlink bursts such as DL Burst #1 210. Each DL burst 210 is associated with a single wireless communication device, such as wireless communication device 106. The downlink sub-frame 204 also includes a preamble 212 and a frame control header ("FCH") 214, which allows the wireless communication device to determine downlink timing (with an error related to propagation time) and understand other basic aspects of the wireless communication system 100 such as location of uplink ranging. The Access frame 200 also includes a transmit turn guard ("TTG") portion 216, and a receive turn guard ("RTG") portion 218. The transmit turn guard 216 is a time period where the wireless communication device is transitioning from a transmitting mode to a receiving mode. In other words, the wireless communication device stops transmitting so that it can receive data from the base station 110. The receive turn guard 218 is a time period where the wireless communication device is transitioning from a receiving mode to a transmitting mode.

The downlink sub-frame 204 also includes one or more IEs 220. An IE 220 in the DL-MAP 206 points to a DL burst 210 and an IE 220 in the UL-MAP 230 points to a UL-burst 228. An IE, if used in the MAP, is generally referred to as a MAP IE. MAP IEs are used to point to particular traffic data burst within the data frame with necessary control information. The MAP IE includes a Connection Identifier ("ID") that points to a particular mobile, geographical location to tell where the data burst is within the 2 dimension frame, and other control information such as coding and modulation form, power information of that particular data burst, and the like.

The uplink sub-frame 208 of the Access frame 200 includes acknowledgement information 224, CQI (Channel Quality Information) information 226, and UL bursts such as UL burst 228. Each UL burst 228 is associated with a single wireless communication device. As can be seen from FIG. 2 the Access frame 200 can include a plurality of DL bursts 210 each associated with a different wireless communication device and a plurality of uplink bursts 228 each associated with a different wireless communication device. The uplink sub-frame 208 of the Access frame 200 also includes a ranging channel 232, which allows the base station 110 to determine how far a wireless communication device is from the base station 110. For example, as wireless communication devices enter a wireless communication cell they are synchronized with a respective base station 110 serving that cell.

Power Profile Reshaping

Each power profile reshaping module 120, 122, in one embodiment, addresses undesirable equal power and same modulation/coding scheme issues for the DL-MAP 206 and UL-MAP 230 in an OFDMA system reshaping and redistributing the power profile within an OFDMA symbol. It should be noted that the present invention is also applicable to any system that divides a spectrum of allocated bandwidth into frequency bins (or tones, or sub-carriers) of specific width and where these bins are orthogonal to each other. In one embodiment, a power profile of an OFDM/OFDMA symbol is the power distribution among frequency sub-carriers within the OFDM/OFDMA symbol. Each power profile reshaping module 120, 122 reshapes and redistributes the power profile based on the selection, by a corresponding base station scheduler 116, 118, of a modulation and coding scheme. The present invention does not change the modulation/coding of the DL-MAP 206 and UL-MAP 230 or the total power allocated to the OFMDA symbol, but reshapes the power profile for different IEs 220 for different connections. The reshaping by each power profile reshaping module 120, 122 allows for connections with good channel conditions to receive their control channel IEs correctly and without excessive power over their required SNR.

Reshaping power profiles also allows the connections at cell edges having bad channel conditions to receive their control channel IEs with increased SNR. The Bit Error Rate ("BER") is improved by utilizing the excessive power saved from IEs having better channel conditions. Additionally, other-cell or inter-cell interference is reduced as a result of reducing the excessive power for these IEs whose channel condition is better than those IEs at the cell edges.

Figure 3:
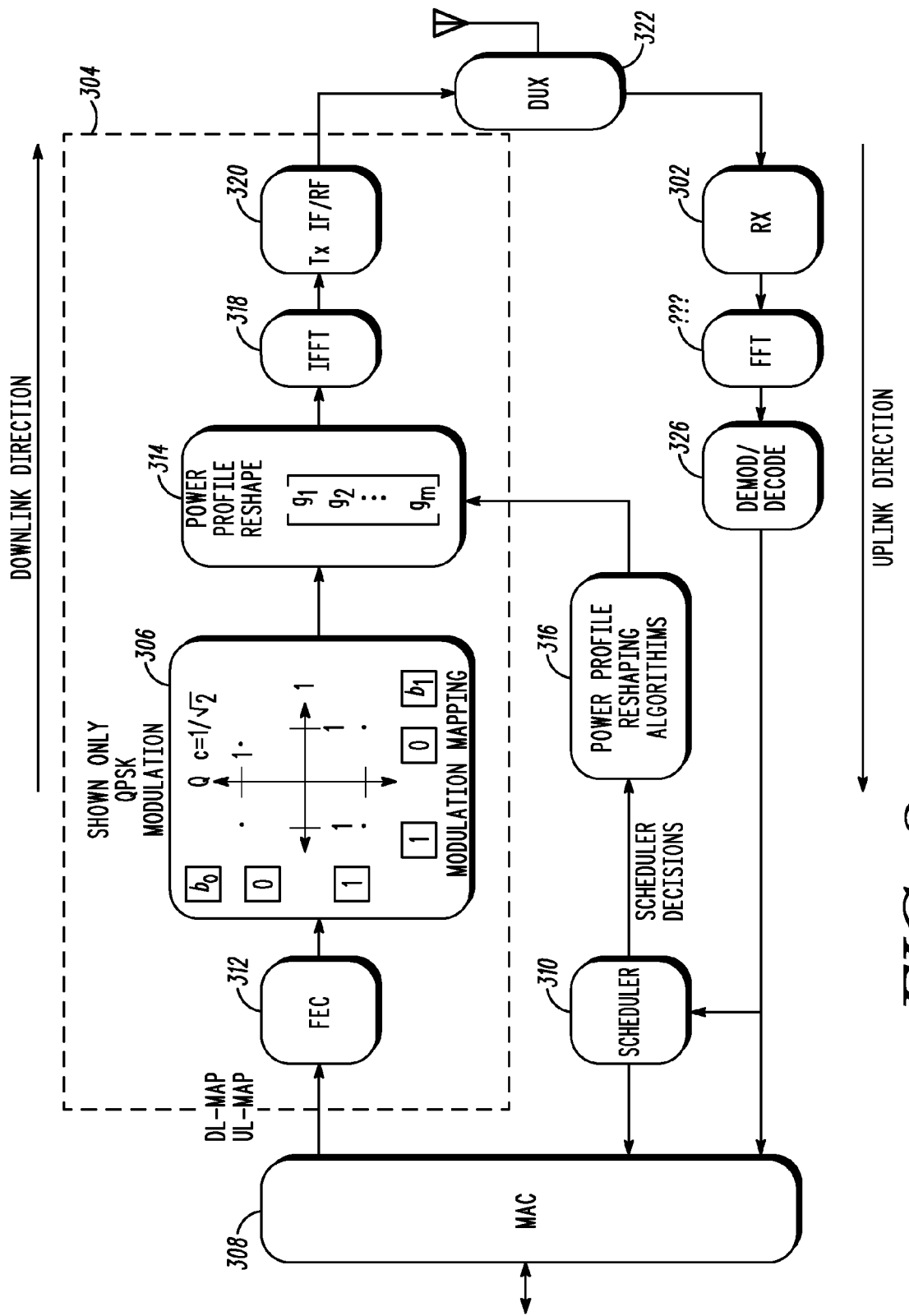
FIG. 3 is a block diagram illustrating various components at a base station for performing power profile reshaping according to an embodiment of the present invention.

FIG. 3 is a block diagram of an OFDMA transceiver of a base station, such as base stations 108 and 110, in accordance with an embodiment of the present invention. FIG. 3 depicts where the power profile reshaping occurs and how the power profile reshaping relates to decisions by a base station scheduler, such as base station schedulers 116 and 118. In FIG. 3, A Media Access Control ("MAC") module 308 manages the input and out of data traffic. A scheduler 310 is communicatively coupled to the MAC 308 and can be part of MAC 308 function(s) that makes decisions on the coding and modulation of a burst, decides where the burst resides in the data frame, and form the DL-MAP and UL-MAP.

On a transmitter side 304, the transceiver includes a Forward Error Correction ("FEC") module 312 that is communicatively coupled to the MAC 308. A symbol modulation module 306 is shown with QPSK modulation, but other modulations such as 16QAM or 64QAM can also be used. A power profile reshaping module 314 is communicatively coupled to the symbol modulation module 306. The power profile reshaping module 314 reshapes the OFDM power symbol from original QPSK modulation power distribution to a mixed power distribution based on the data burst modulation schemes pointed by the IEs in the DL-MAP and UL-MAP. The scheduler decision on data burst modulation scheme is applied as an input to the power profile reshaping algorithm block 316, and the resulting output of the power shaping algorithm is applied to the power profile reshaping module 314. An Inverse Fast Fourier Transform ("IFFT") module 318 spreads the data to orthogonal frequency sub-carriers. FIG. 3 also shows a typical Radio Frequency ("RF") module 320 of a transmitter that modulates the subcarriers onto an RF carrier. A DUX module 322 coupled to the RF module can be either an RF switch for a TDD system or an RF duplexer for a frequency division duplexing ("FDD") system.

On a receiver side, the transceiver includes an RX block 302 that represents the RF circuits and a Fast Fourier Transform ("FFT") module 324 that converts the data back to the same domain as was applied by a transmitter of the data. A Demodulation/Decoder module 326 represents a corresponding demodulator and decoder on the receive side to recover the transmitted data. The output of this module provides inputs to both the scheduler 310 and the MAC 308. In one embodiment, as shown by FIG. 3, the base station scheduler 116 makes its decisions based on the channel condition feedback received at the base station receiver 302. It should be noted that the components shown in FIG. 3 can reside at the site controller 112 and/or the base station 110.

To maintain unity power for each modulation symbol (not OFDMA symbols) so that the average modulation symbol energy is equal to 1, regardless of whether it is QPSK, 16QAM or 64 QAM, digital gains for normalizing different modulation symbols are defined as follows:

1. If modulation order=2 (QPSK), then $c=1/\sqrt{2}$
2. If modulation order=4 (16-QAM), then $c=1/\sqrt{10}$
3. If modulation order=6 (64-QAM), then $c=1/\sqrt{42}$ It should be noted that these normalized gains are factored in already at the modulation symbol mapping stage 306 in the transmitter side 304 of FIG. 3. Therefore, the proposed power profile reshaping stage has, as input, modulation symbols with the gain scaled based on its modulation scheme. Also, in each of the DL-MAP 206 and the UL-MAP 230 there is a fixed portion comprising overhead information that applies to all connections and there are connection specific IEs. Since the scheduler 116 does not make any decision on these fixed portions of the DL-MAP 206 and UL-MAP 230, these fixed portions remain with their original equal power allocation. However, if part of the connection specific IEs are within a single OFDMA symbol, then power profile reshaping applies and they are treated as the worst channel condition case.

In one embodiment, the total usable number of sub-carriers of an OFMDA symbol is N, which excludes the guard band sub-carriers and the DC (Direct Current Component which has a zero frequency, or sub-carrier 0) sub-carrier. In one example, since the Pilot sub-carriers are, in general, set to a power that is 2.5 dB higher than data sub-carriers, the power profile reshaping includes the pilot sub-carriers within the sub-channels to maintain their relative ratio with the surrounding data sub-carriers. Within an OFDMA symbol, it can be assumed that there are total of i individual IEs, i=1, 2, . . . , n, that define n bursts. Therefore:

$$N = N_1 + N_2 + \ldots + N_n = \sum_{i=1}^{n} N_i \quad \text{EQ (1)}$$

For each of the bursts, a specific coding and modulation scheme is selected by the base station scheduler 116, 118 based on the Channel Quality Indicator 226 information. The complex Quadrature Phase Shift Keying ("QPSK") symbols, in one embodiment, are assumed to be defined as $$b_{i,j} = Re(b_{i,j}) + jIm(b_{i,j}) \quad \text{EQ (2)}$$

$$|b_{i,j}| = \sqrt{2}$$

The total power of an OFMDA symbol with all its contents being overhead channels (QPSK modulation) and without profile reshaping is $$P_{ofdma\_symbol} = \sum_{i=1}^{N_1} \left| \frac{1}{\sqrt{2}} b_{i,1} \right|^2 + \sum_{i=1}^{N_2} \left| \frac{1}{\sqrt{2}} b_{i,2} \right|^2 + \ldots + \sum_{i=1}^{N_n} \left| \frac{1}{\sqrt{2}} b_{i,n} \right|^2 \quad \text{EQ (3)}$$

$$= (N_1 + N_2 + \ldots + N_n)$$

This is based on the assumption that the modulated symbols have unity energy. With the power profile reshaping performed by the power profile reshaping module 120, the total power of a profile reshaped OFDMA symbol is $$P_{reshaped\_symbol} = g_0 * \sum_{i \in \Omega_0} N_i + g_1 * \sum_{i \in \Omega_2} N_i + \ldots + \quad \text{EQ (4)}$$
$$g_{m-1} * \sum_{i \in \Omega_{m-1}} N_i$$

where $$\begin{cases} \Omega_0 & \text{belongs to the set of } IEs \text{ where } 1st \text{ scheme is used} \\ & \text{as modulation} \\ \Omega_1 & \text{belongs to the set of } IEs \text{ where } 2nd \text{ scheme is used} \\ & \text{as modulation} \\ \vdots \\ \Omega_{m-1} & \text{belongs to the set of } IEs \text{ where } m^{th} \text{ scheme is used} \\ & \text{as modulation} \end{cases} \quad \text{EQ (5)}$$

and where the gain, that is, $g_i$, and its mapping to the corresponding modulation and coding scheme is defined in Table 1 below.

TABLE 1

Mapping Table for Gains and Modulation and Coding Schemes

| Modulation and Coding rate | Repeat | Gain |
|---|---|---|
| QPSK ½ | 6 | $g_0$ |
| QPSK ½ | 4 | $g_1$ |
| QPSK ½ | 2 | $g_2$ |
| QPSK ½ | 0 | $g_3$ |
| QPSK ¾ | 0 | $g_4$ |
| 16-QAM ½ | 0 | $g_5$ |
| 16-QAM ¾ | 0 | $g_6$ |
| 64-QAM ⅔ | 0 | $g_7$ |
| 64-QAM ¾ | 0 | $g_8$ |
| 64-QAM ⅚ | 0 | $g_9$ |

Depending on the mapping strategy, some of the modulation and coding schemes may be grouped together so that a gain may cover a range of modulation and coding rates. Also, note that these are relative gains, and they are used to reshape the power profiles among sub-carriers whose information points to the data burst with different modulation and coding schemes. As discussed above, a requirement, in one embodiment, is that the resulting total OFDMA symbol power is unchanged after the power profile reshaping, that is, $$P_{ofdma\_symbol} = P_{reshape\_symbol} \quad \text{EQ (6)}$$

The goal is to improve the BER of a few particular overhead channel IEs and to reduce the transmitted power of the remaining burst specific IEs, while keeping the total OFDMA symbol power unchanged, as is the case with equal power allocation. There are two different strategies to calculate the gains, which can have different results. A first strategy is to leave the bad channel condition IE gains unchanged while reducing the gains for the IEs with good channel conditions. Then, another gain is applied to all of them such that the final OFDMA symbol power is unchanged. The results are gain ratios between the good and bad channel conditions that are fixed.

A second strategy is to increase the gains to the IEs with bad channel conditions, while reducing the gains for the IEs with good channel conditions such that the total symbol power is unchanged. A benefit for the second strategy is that a power profile can be dynamically reshaped depending on the ratio of good and bad channel conditions for that OFDMA symbol. The higher number of better channel condition IEs there are, the better the BER can be improved for the IEs with bad channel conditions. Another benefit of the second strategy is that the amount of energy reduced for the good channels is known and therefore, the SNR improvement that is made for the bad channels can be determined.

Also with respect to Table 1, the base station scheduler 116, 118 makes the decision on the selection of modulation and coding schemes for the data traffic bursts based on information such as Channel Quality Information ("CQI") 226 or a Receiver Signal to Interference plus Noise Ratio ("SINR"), which are shown in the first column of Table 1. These modulation and coding schemes lead the choice of gain mappings to the corresponding IEs in the DL-MAP 206 and UL-MAP 230.

The following is a discussion on how to find the gains shown in Table 1. Because the power profile reshaping module 120 reshapes the power profile based on the traffic data burst's modulation and coding from one modulation and coding scheme to another, it is desirable to find out what the power gain ratio from one modulation/coding scheme to another is. In one embodiment, the ratios from Table 2 and Table 3 listed below are determined.

TABLE 2

Table 262a in 802.16d/e Normalized CINR per modulation (BER = 1e−6)

| Modulation/FEC-CC Rate | Normalized CINR (dB) | Difference from Previous item |
|---|---|---|
| BPSK ½ | 13.9 | 0 |
| QPSK ½ | 16.9 | 3 |
| QPSK ¾ | 18.65 | 1.75 |
| 16QAM ½ | 23.7 | 5.05 |
| 16QAM ¾ | 25.45 | 1.75 |
| QAM64 ½ | 29.7 | 4.25 |
| QAM64 ¾ | 31.45 | 1.75 |

TABLE 3

Table 332 in 802.16d - Normalized C/N per modulation

| Modulation/FEC Rate | Normalized C/N (dB) | Difference from Previous item |
|---|---|---|
| Fast Feedback IE | 0 | 0 |
| CDMA | 3 | 3 |
| QPSK ½ | 6 | 3 |
| QPSK ¾ | 9 | 3 |
| 16QAM ½ | 12 | 3 |
| 16QAM ¾ | 16 | 4 |
| QAM64 ½ | 18 | 3 |
| QAM64 ⅔ | 20 | 3 |
| QAM64 ¾ | 21 | 1 |
| QAM64 ⅚ | 23 | 2 |

However, for simplicity and illustration purposes, one embodiment uses a few modulation and coding schemes based on the following assumptions. For the DL/UL-MAPs, the modulation and coding is QPSK with ½ rate encoding, plus 4 times repetition. With QPSK modulation, the normalized gain is set $1/\sqrt{2}$ per sub-carrier for complex symbols. Assuming that only QPSK, 16QAM and 64 QAM modulations are taken into consideration without counting the coding rates, if the corresponding data traffic burst of this connection is allocated with 16QAM, the normalized gain is set somewhere around $1/\sqrt{10}$ per sub-carrier for that modulation symbol. From this argument the ratio of $$\frac{1/\sqrt{2}}{1/\sqrt{10}} = \sqrt{\frac{10}{2}} = \sqrt{5}$$

is kept for all the sub-carriers of its IE in the MAP. Note that the IEs already have QPSK's normalized gain factored in. If the corresponding data traffic burst of the connection is allocated with 64QAM, the ratio is $$\frac{1/\sqrt{2}}{1/\sqrt{42}} = \sqrt{\frac{42}{2}} = \sqrt{21}.$$

As for the repetition, there can be a 3 dB gain ratio reduction for each repetition if desired. Since different coding rates are not considered in some embodiment, this repetition may also not need to be considered.

In a more generalized discussion of the power profile reshaping method, the number of gains can be expanded beyond three by considering QPSK, 16 QAM and 64 QAM with different coding rates, as shown, for example, in Table 1. Then the gain ratio can be defined as:

$$g_i = \frac{1}{\lambda_i} \text{ where } i \text{ is the } i^{th} \text{ gain ratio} \quad \text{EQ (7)}$$

for the $i^{th}$ modulation and coding scheme where $\lambda i$ is the inverse value of the gain $g_i$, which can be selected from Table 1, i=1, 2, 3, ..., m, m corresponds to the number of modulation schemes used, and $$g_0 = \frac{\left(\sum_{i=0}^{n} N_i\right) - \left(\frac{1}{\lambda_1} * \left(\sum_{i \in \Omega_1} N_i\right) + \ldots + \frac{1}{\lambda_{m-1}} * \sum_{i \in \Omega_{m-1}} N_i\right)}{\sum_{i \in \Omega_0} N_i} \quad \text{EQ (8)}$$

where $$\begin{cases} \Omega_0 & \text{belongs to the set of } IEs \text{ where } 1st \text{ scheme is used as modulation} \\ \Omega_1 & \text{belongs to the set of } IEs \text{ where } 2nd \text{ scheme is used as modulation} \\ \vdots \\ \Omega_m & \text{belongs to the set of } IEs \text{ where } m^{th} \text{ scheme is used as modulation} \end{cases} \quad \text{EQ (9)}$$

Here, it was assumed that $g_0$ is the largest gain among all the gains for different modulations and coding schemes. With the assumption of simplified profiling with modulations only, and with only three level gains for QPSK, 16QAM and 64QAM, the profile reshaping can be defined as, $$g_1 = \frac{\left(\sum_{i=0}^{n} N_i\right) - \left(\frac{1}{5} * \left(\sum_{i \in \Omega_5} N_i\right) + \frac{1}{21} * \sum_{i \in \Omega_3} N_i\right)}{\sum_{i \in \Omega_i} N_i} \quad \text{EQ (10)}$$

where $$\begin{cases} \Omega_1 & \text{belongs to the set of } IEs \text{ where } QPSK \text{ is used as modulation} \\ \Omega_2 & \text{belongs to the set of } IEs \text{ where } 16 \ QAM \text{ is used as modulation} \\ \Omega_3 & \text{belongs to the set of } IEs \text{ where } 64 \ QAM \text{ is used as modulation} \end{cases} \quad \text{EQ (11)}$$

Here it was assumed that the gain for QPSK modulation is $g_1$. The power profile reshaping performed above has the following advantages. Burst specific IEs are fixed size packets. With fixed OFDMA symbol power, each of the IEs share a portion of the total OFDMA symbol power that is proportional to the size of the IE. If a particular Mobile Station is under a very good channel condition, then the corresponding IE does not need to be sent out with the power exceeding its required SNR. By reducing a few of the IEs' transmission power, at cell edge, these potential interferences from "other cells" can be drastically reduced such that other Mobile Stations at the cell edge have a better chance to receive their signals correctly. (Remember for PUSC, each cell has its own sub-carrier permutation sequence so that common channels do not fall on to the same sub-carriers for different cells.

However, with an equal power transmission scheme, these IEs with good channel conditions are still being transmitted with the same power as these IEs with bad channel conditions (such as cell edge Mobile Stations). So the IEs with good channel conditions can interfere with the IEs with bad channel conditions. Therefore, to improve BER by reshaping power profiles within an OFDMA symbol is to improve the BER of these with bad channel conditions without sacrificing the BER performance of the IEs with good channel conditions. With the same total OFDMA symbol power as without the power profile reshaping, the power profile reshaping module 120, 122 does not increase the interference level to other cell Mobile Stations even though the signal power of the IEs with bad channel conditions on the cell edges is increased. The present invention provides better cell edge performance because a higher signal power reaches to the edge of the cell.

To further quantify the benefits of other cell interference gains at the cell edge, the following observations can be made. For IEs in the DL-MAP 206 and UL-MAP 230, they use QPSK ½ rate encoding with a certain number of repetitions, as it is specified in the 802.16d/e specifications. Although there are cell specific permutation sequences used by each cell to avoid the exact overlap of control channels on top of each other, such as FCH, and fixed portions of the DL-MAP 206, connection specific IEs in the DL-MAP 206 do overlap with a fixed portion of the control channels from the other cells directly on top of each other. Therefore, regardless of control channel type, the average Signal to Noise Ratio ("SNR") at the cell edge is at best is zero dB.

By using the power profile reshaping method discussed above, the average SNR gain at the cell edge is equal to average SNR gain relative to QPSK in dB=10 log $\lambda_i$     EQ (12)

where the $\lambda_i$ is the gain ratio defined in EQ (7) and depends on the type of the modulation/coding schemes of the traffic data bursts. These average SNR gains are quantified as negative gains such that the inter-cell interferences are reduced by the number of dBs for each of the modulation and coding type within a cell as well as at the cell edge.

As long as there is at least one IE that has a better channel condition, the total gain for the QPSK modulated sub-carriers is increased by $$\begin{aligned}\text{total gain for the QPSK modulated sucarriers} &= \frac{g_1}{\sum_{i \in \Omega_1} N_i} \\ &= \frac{\left(\sum_{i=1}^{n} N_i\right) - \left(\frac{1}{\lambda_2} * \left(\sum_{i \in \Omega_2} N_i\right) + \ldots + \frac{1}{\lambda_m} * \sum_{i \in \Omega_m} N_i\right)}{\sum_{i \in \Omega_1} N_i} \\ &= \frac{\left(\sum_{i=1}^{n} N_i\right) - \left(\frac{1}{\lambda_2} * \left(\sum_{i \in \Omega_2} N_i\right) + \ldots + \frac{1}{\lambda_m} * \sum_{i \in \Omega_m} N_i\right)}{\left(\sum_{i \in \Omega_1} N_i\right)^2}\end{aligned} \quad \text{EQ (13)}$$

Here it can be assumed that the gain for the QPSK modulation is $g_1$. Note that the gains realized in EQ (13) are to increase the SNR for these connections at the cell edge.

Another consideration is for bursts that are capable of Hybrid Automatic Repeat reQuest ("HARQ") retransmissions. Since the retransmission reduces the probability of error rate at the receiver after the combining, the required SNR at the receiver after taking retransmission into consideration is reduced by 1 to 3 dB. It should be noted that higher modulation/coding rates can be used. By adding the HARQ retransmission gain into the scheduler modulation and coding rate selection process, a more conservative gain reduction in the power profile reshaping can be considered. This is because there is no HARQ process for the DL-MAP 206 and UL-MAP 230 so that they require higher SNR at the receiver. This is translated to choosing a smaller $\lambda_i$ in EQ. (7) so that the potential HARQ gains are covered.

Additionally, if IEs in a MAP, that is, DL-MAP 206 or UL-MAP 230, are encoded with a code without block separation, the IEs in the MAP are ordered in such a way that the IEs pointing to the data bursts with QPSK modulation are first in the MAP. The IEs pointing to the data bursts with 16QAM then come in second and IEs pointing to data bursts with 64 QAM are last. Ordering IEs with higher power first and with lower power last does not affect the decoding process for these high power bits, which are intended for these cell edge mobiles. For the mobiles within the cell, they can decode these lower power IEs as well as higher power IEs.

Power Profile Reshaping Example

Figure 4:
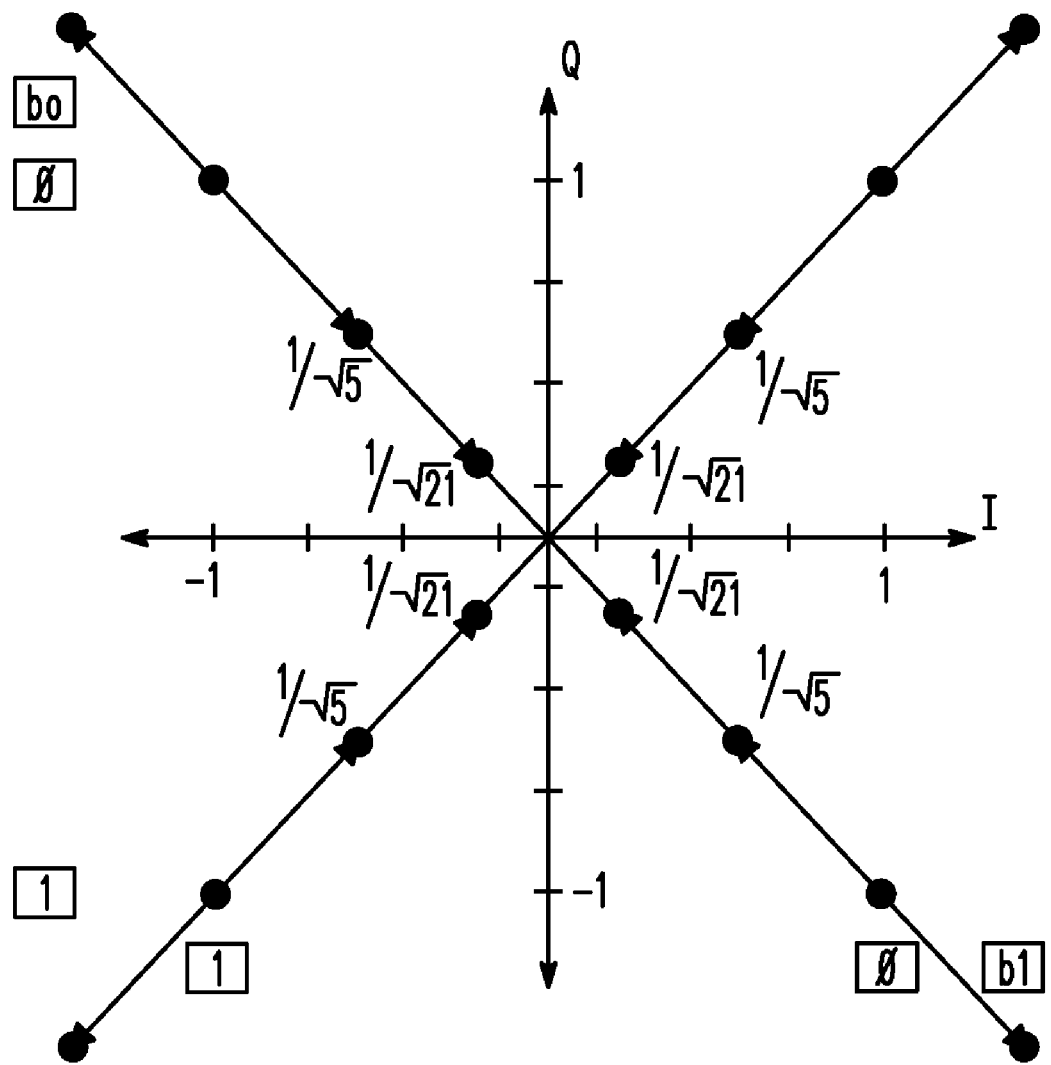
FIG. 4 is a graph illustrating a power profile reshaping example according to an embodiment of the present invention.
Figure 5:
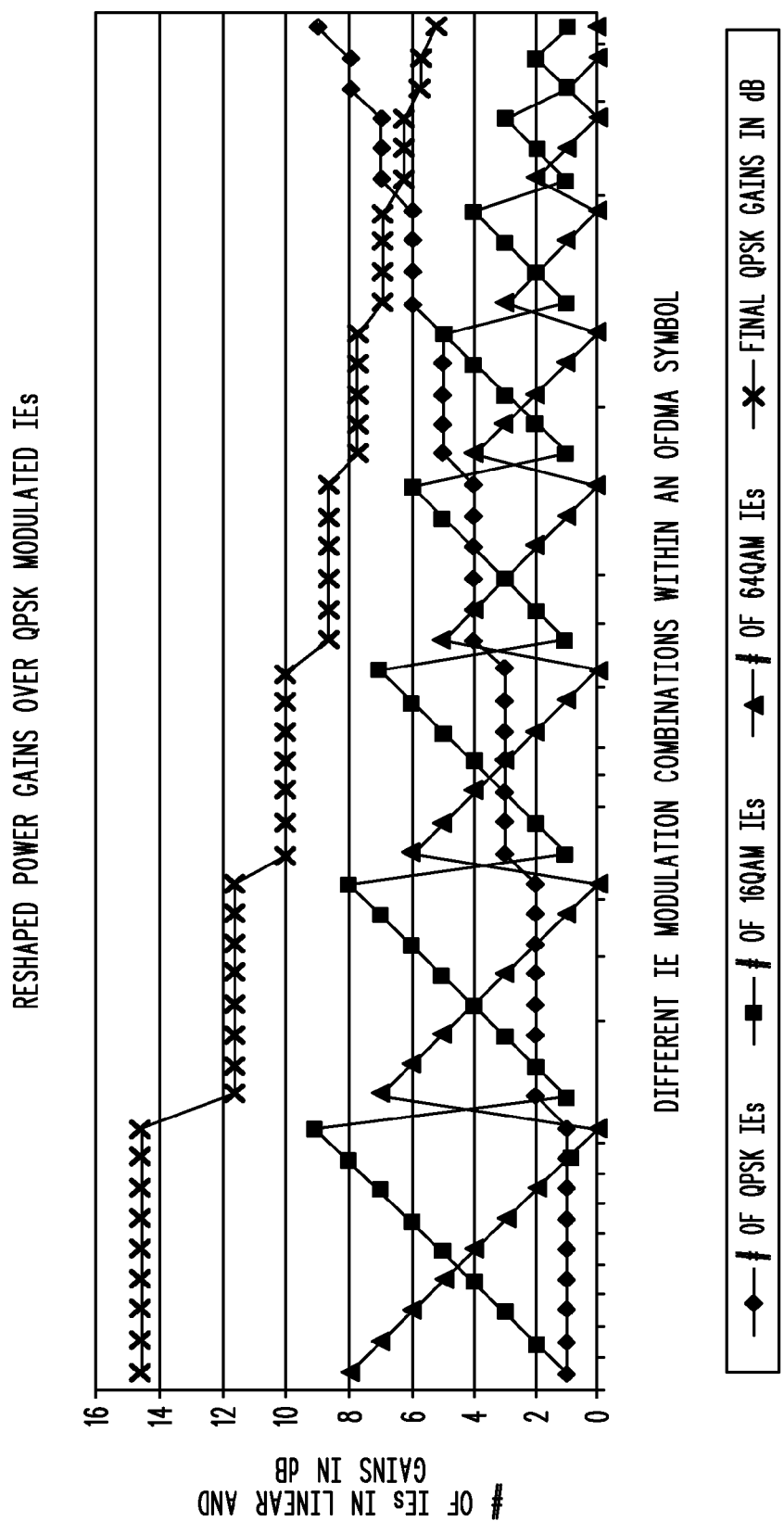
FIG. 5 is a graph showing various information element modulation combinations within an OFDMA symbol according to an embodiment of the present invention.

FIG. 4 illustrates a power profile reshaping example and FIG. 5 is a graph illustrating power profile reshape with 10 overhead control channel IEs Combinations. Assuming a 10 MHz bandwidth, there are 720 usable data sub-carriers. For 30 sub-channels, each sub-channel then has 24 sub-carriers. With 2 bits per sub-carrier, around 44 bits per connection specific IEs, 30 connection specific IEs per OFDMA symbol can be accommodated (assuming that a specific OFDMA symbol is allocated all for connection specific IEs). Also assuming that QPSK, 16QAM and 64QAM modulation schemes are used, three level gains are used so that set $\Omega_1$ includes the number of QPSK modulation IEs, set $\Omega_2$ includes the number of 16QAM modulation IEs, and set $\Omega_3$ includes the number of 64QAM modulation IEs.

Since all the IEs have the same size, so $N_1 = N_2 = N_3 = 24$. Also, n=10, which is the total number of IEs. By using EQs. (7), (8), (9) and (10)

$$g_1(\Omega_1, \Omega_2, \Omega_3) = \frac{\left(\sum_{i=1}^{30} N_i\right) - \left(\frac{1}{5} * \left(\sum_{i \in \Omega_2} N_i\right) + \ldots + \frac{1}{21} * \sum_{i \in \Omega_3} N_i\right)}{\sum_{i \in \Omega_1} N_i}$$

$$= \frac{(30 * 24) - \left(\frac{1}{5} * 24 * \Omega_2 + \frac{1}{21} * 24 * \Omega_3\right)}{24 * \Omega_1}$$

EQ (14)

and $$g_2 = \frac{1}{5}$$

EQ (15)

$$g_3 = \frac{1}{21}$$

EQ (16)

As shown in FIG. 4, the power profile reshaping process starts from the base QPSK modulation with reduced gains for 16 QAM and 64QAM mapped IEs and expanded gains for QPSK mapped IEs. Now $g_1$ is a function of $\Omega_i$, i=1, 2, 3. By changing the combinations of the size of these sets, a set of gains can be obtained which show the dynamical range of the gain variations in dB based on the different combinations of IEs within an OFDMA symbol, as shown in FIG. 5

Therefore, as can be seen from the above discussion, the present invention provides the following advantages. A power profile reshaping method is provided that is based on base station scheduler coding and modulation decisions for connection specific bursts. The power profile reshaping reshapes and redistributes the power profile among different burst related control Information Elements ("IEs") within an OFDMA symbol. The reshaping results in excessive transmission powers being reduced without sacrificing corresponding required receiving signal quality at the wireless devices. Also, the required signal quality for these mobiles at the cell edge is enhanced with in addition to saving excessive power. Another advantage of the present invention is that inter-cell interference is reduced. All of these advantages are provided without increasing the total targeted OFDMA symbol power.

Information Processing System

Figure 6:
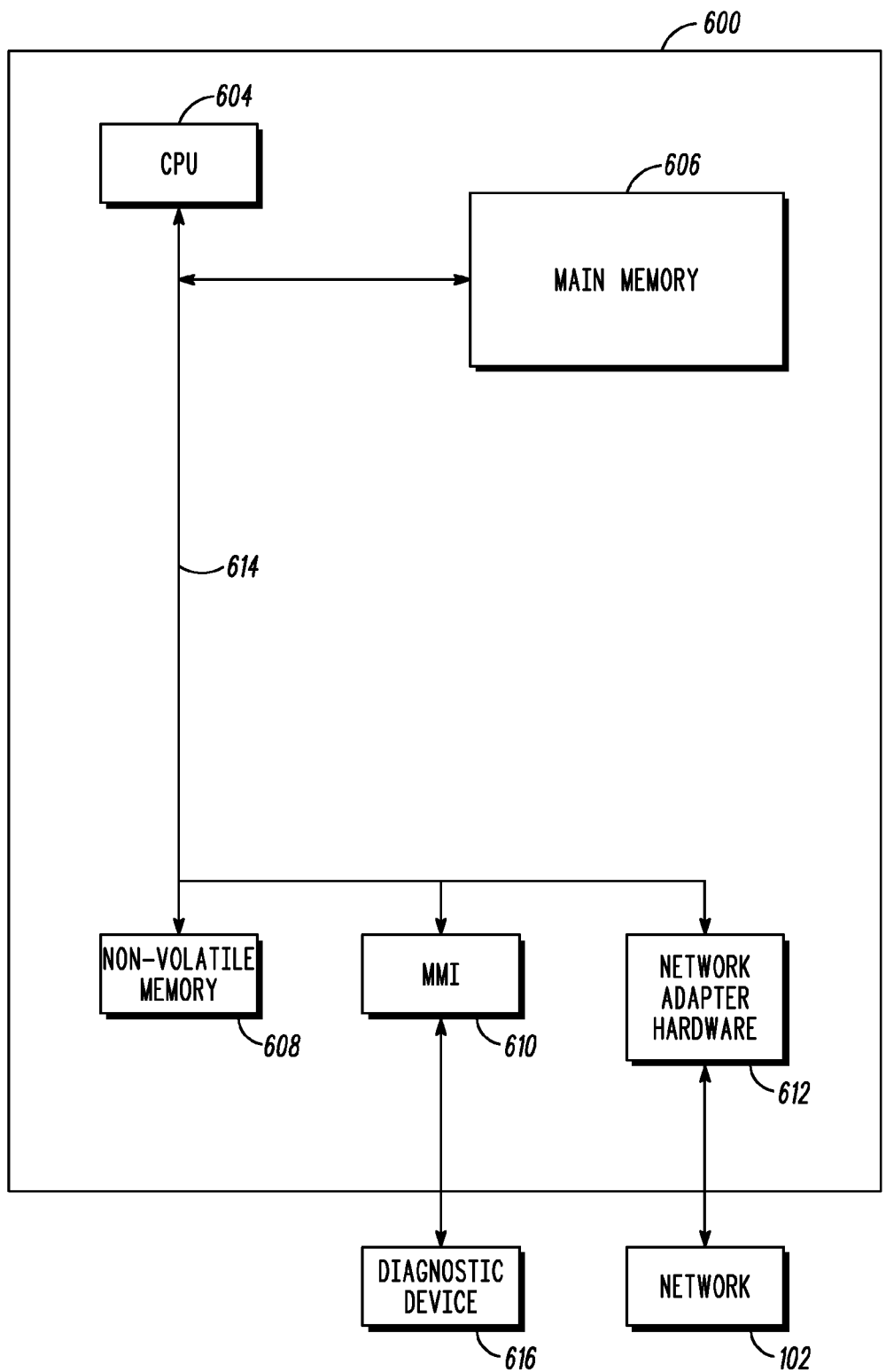
FIG. 6 is a block diagram illustrating a information processing system according to an embodiment of the present invention.

FIG. 6 is a block diagram illustrating a more detailed view of an information processing system 600, preferably a site controller such as site controllers 112 and 114, according to an embodiment of the present invention. The information processing system 600, in one embodiment, resides within a base station, such as base stations 108 and 110. In another embodiment, the information processing system 600 resides outside of and is communicatively coupled to a base station. The information processing system 600 includes a processor 604 that is connected to a main memory 606 (e.g., volatile memory), a non-volatile memory 608, a man-machine interface ("MMI") 610, and a network adapter hardware 612. A system bus 614 interconnects these system components. The main memory 606 includes the power profile reshaping module 120 and the scheduler 116, which have been discussed in greater detail above. In one embodiment, these components are algorithms that can be executed in the processor 604. Parameters for these components can reside in the main memory 606. In another embodiment these components are separate hardware components residing outside of the memory 606. The MMI 610, in one embodiment, is used to directly connect one or more diagnostic devices to the information processing system 600.

The network adapter hardware 612 is used to provide an interface to the network 102. For example, the network adapter 612, in one embodiment, provides the Ethernet connections between the base station and the wireless communications network 102. An embodiment of the present invention can be adapted to work with any data communications connections including present day analog and/or digital techniques or via a future networking mechanism.

Wireless Communication Device

Figure 7:
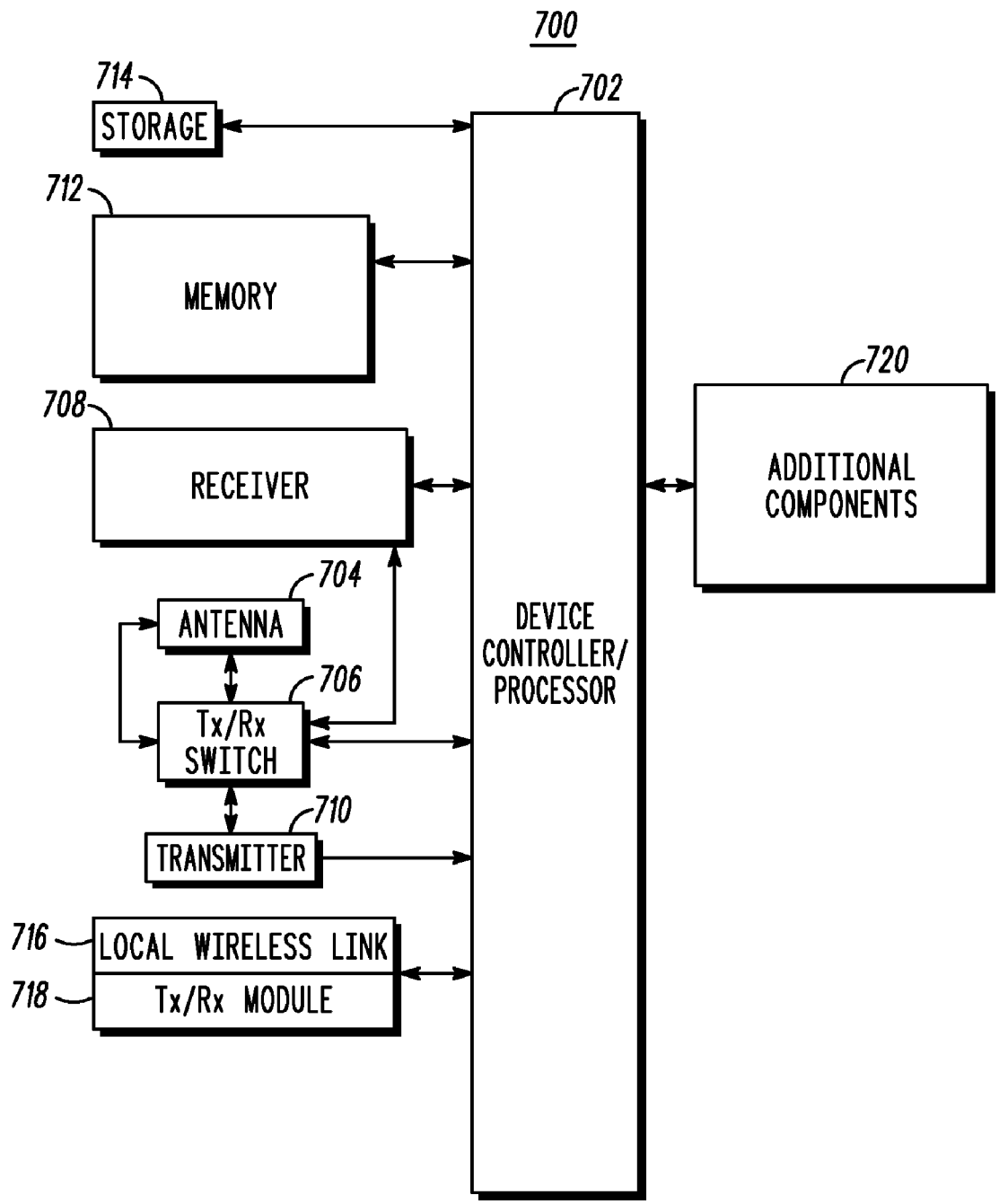
FIG. 7 is a block diagram illustrating a wireless communication device according to an embodiment of the present invention.
Figure 8:
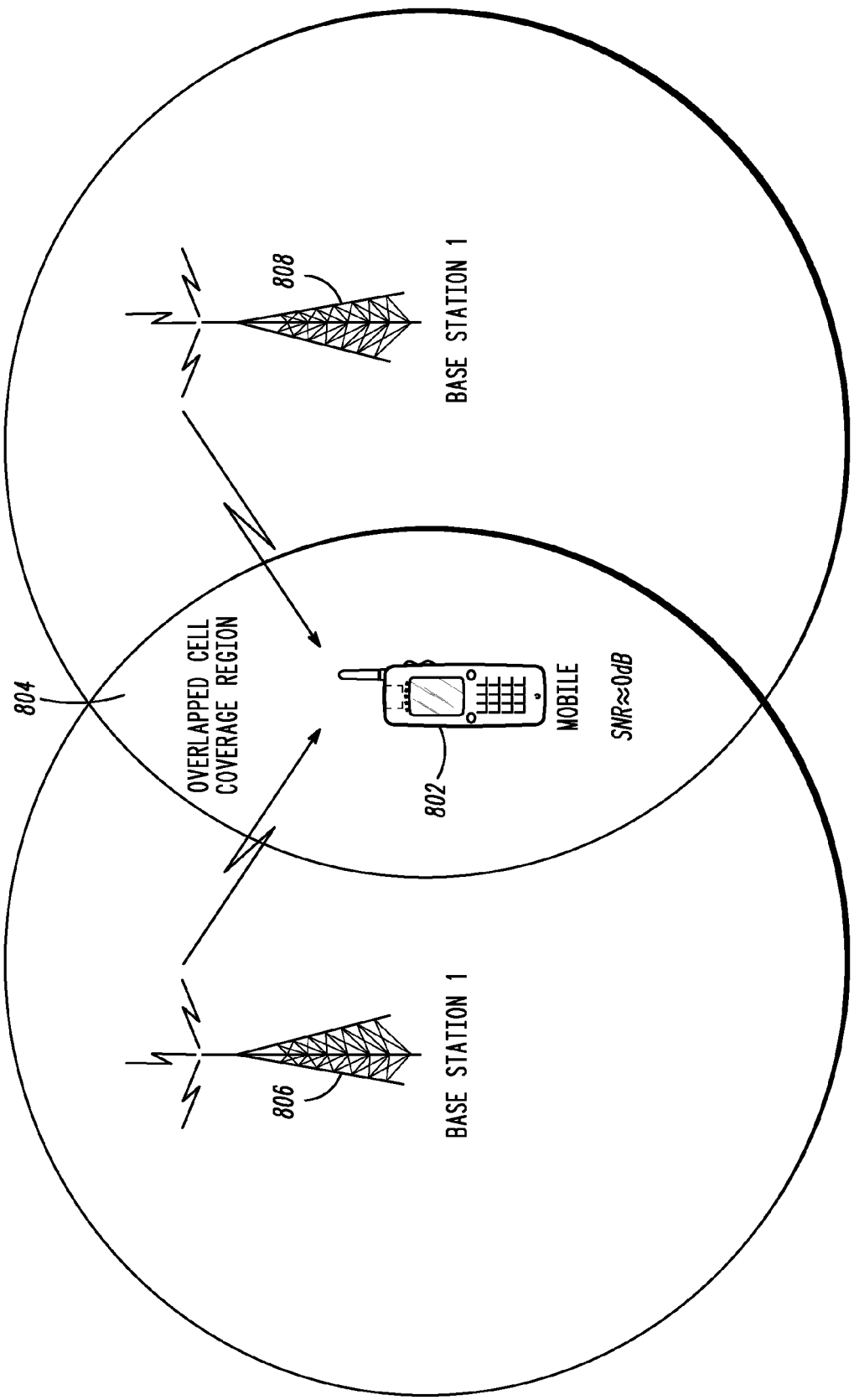
FIG. 8 is a graphical representation of two overlapping communication cells wherein a wireless device experiences interference from one or more base station.

FIG. 7 is a block diagram illustrating a more detailed view of the wireless communication device 700, such as wireless communication devices 104, 106, 134, and 132, according to an embodiment of the present invention. FIG. 7 illustrates only one example of a wireless communication device type. In one embodiment, the wireless communication device 700 is capable of transmitting and receiving wireless information on the same frequency such as in an 802.16d/e system using TDD.

The wireless communication device 700 operates under the control of a device controller/processor 702 that controls the sending and receiving of wireless communication signals. In receive mode, the device controller 702 electrically couples an antenna 704 through a transmit/receive switch 706 to a receiver 708. The receiver 708 decodes the received signals and provides those decoded signals to the device controller 702.

In transmit mode, the device controller 702 electrically couples the antenna 704, through the transmit/receive switch 706, to a transmitter 710. It should be noted that in one embodiment, the receiver 708 and the transmitter 710 are a dual mode receiver and a dual mode transmitter for receiving/transmitting on various access networks. In another embodiment a separate receiver and transmitter is used for each access network technology type.

The device controller 702 operates the transmitter and receiver according to instructions stored in a memory 712. These instructions include, for example, a neighbor cell measurement-scheduling algorithm. The wireless communications device 700 also includes non-volatile storage memory 714 for storing, for example, an application waiting to be executed (not shown) on the wireless communications device 700. The wireless communications device 700, in this example, also includes an optional local wireless link 716 that allows the wireless communications device 700 to directly communicate with another wireless device without using a wireless network (not shown). The optional local wireless link 716, for example, is provided by Bluetooth, Infrared Data Access (IrDA) technologies, or the like.

The optional local wireless link 716 also includes a local wireless link transmit/receive module 718 that allows the wireless communications device 700 to directly communicate with another wireless device such as wireless communication devices communicatively coupled to personal computers, workstations, and the like. It should be noted that the optional local wireless link 716 and the local wireless link transmit/receive module 718 can be used to communicate with various access networks. Also, the wireless communications device 700 includes other components 720 such as a display, user interfaces, tactile interfaces, and the like that are known to one or ordinary skill in the art.

Process of Reshaping a Power Profile for an OFMDA Symbol

Figure 9:
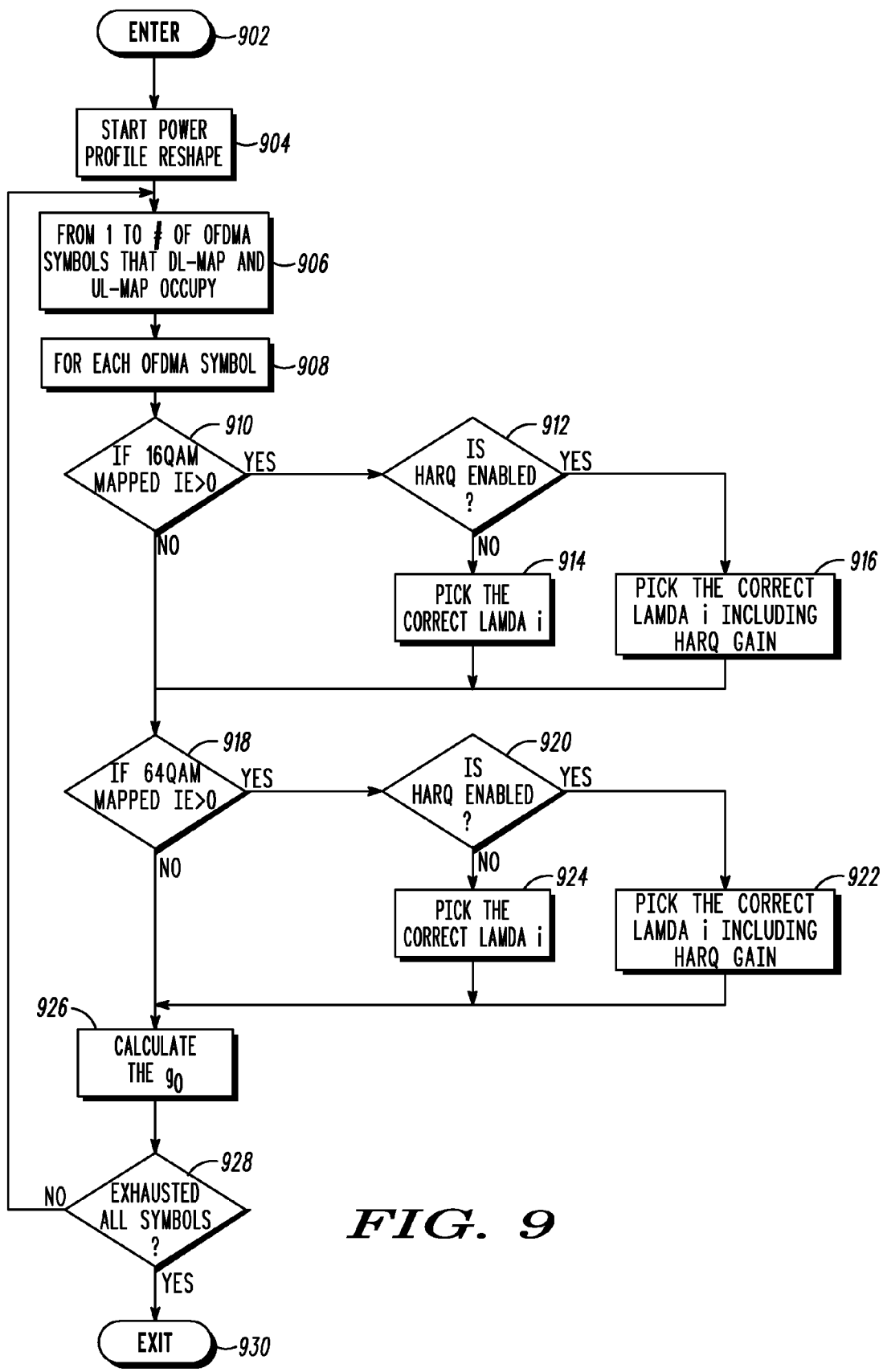
FIG. 9 is an operational flow diagram illustrating a process of reshaping power profiles for information elements within an OFDMA symbol according to an embodiment of the present invention.

FIG. 9 is an operational flow diagram illustrating a process whereby a power reshaping profile module 120, 122 reshapes a power profile for an OFDMA symbol according to an embodiment of the present invention. The operational flow diagram of FIG. 9 begins at step 902 and flows directly to step 904. The power reshaping profile module, at step 904, begins the power profile reshaping process. For each OFDMA symbol, the power reshaping profile module 122, at step 906, determines the OFDM symbols that the UL-MAP and DL-MAP point to. The power reshaping profile module 122, at step 908, initiates a looping function if more than one OFDMA symbol was identified in step 906.

The power reshaping profile module, at step 910, determines if the number of IEs mapped with 16QAM modulation is greater than zero. In other words, the power reshaping profile module determines if there is at least one IE that is modulated with 16QAM. If the result of the determination at step 910 is negative, the operational flow diagram proceeds to step 918. If the result of the determination at step 910 is positive, the power reshaping profile module 122 determines if the burst pointed by this IE is a new transmission or a HARQ retransmission. That is, if the determination at step 910 is positive, the operational flow diagram proceeds to step 912, where the power reshaping profile module determines if HARQ is enabled. If the determination at step 912 is negative (i.e., a new transmission), then the operational flow diagram proceeds to step 914, where the power profile reshaping module selects a $\lambda_i$ that corresponds to the 16QAM modulation (see EQ. (7) above). The operational flow diagram then proceeds to step 918. If the determination at step 912 is positive (i.e., a HARQ transmission), then the operational flow diagram proceeds to step 916, where the power profile reshaping module selects a $\lambda_i$ that is corresponding to the 16QAM modulation (see EQ. (7) above), and then subtracts a predetermined $\Delta_1 > 0$ from $\lambda_i$ such that the gain for the retransmission IE is larger than the new transmission IE. The operational flow diagram then proceeds to step 918.

At step 918, the power profile reshaping module determines if the number of IEs with 64 QAM modulation is greater than zero. In other words, the power profile reshaping module determines if there is at least one IE that is modulated with 64 QAM. If the result of the determination at step 918 is negative, operational flow diagram proceeds to step 926. If the result of the determination at step 918 is positive, the power reshaping profile module 122 determines if the burst pointed by this IE is a new transmission or a HARQ retransmission. That is, if the result of the determination at step 918 is positive, the operational flow diagram proceeds to step 920, where the power reshaping profile module determines if HARQ is enabled. If the determination at step 920 is negative (i.e., a new transmission), the operational flow diagram proceeds to step 924 where the power profile reshaping module selects a $\lambda_i$ that corresponds to the 64QAM modulation (see EQ. (7) above). The operational flow diagram then proceeds to step 926. If the determination at step 920 is positive, the operational flow diagram proceeds to step 922 where the power profile reshaping module selects a $\lambda_i$ that is corresponding to the 64QAM modulation (see EQ. (7) above), and then subtracts a predetermined $\Delta_2 > 0$ from $\lambda_i$ such that the gain for the retransmission IE is larger than the new transmission IE. The operational flow diagram then proceeds to step 926.

At step 926, the power profile reshaping module calculates $g_0$ using EQ. (8) discussed above. At step 928, the power profile reshaping module 122 determines if all of the OFDMA symbols identified in step 906 have been exhausted. If the result of this determination is positive, the operational flow diagram ends at step 930. If the result of this determination is negative, the operational flow diagram returns to step 906.

Another Process of Reshaping a Power Profile for an OFMDA Symbol

Figure 10:
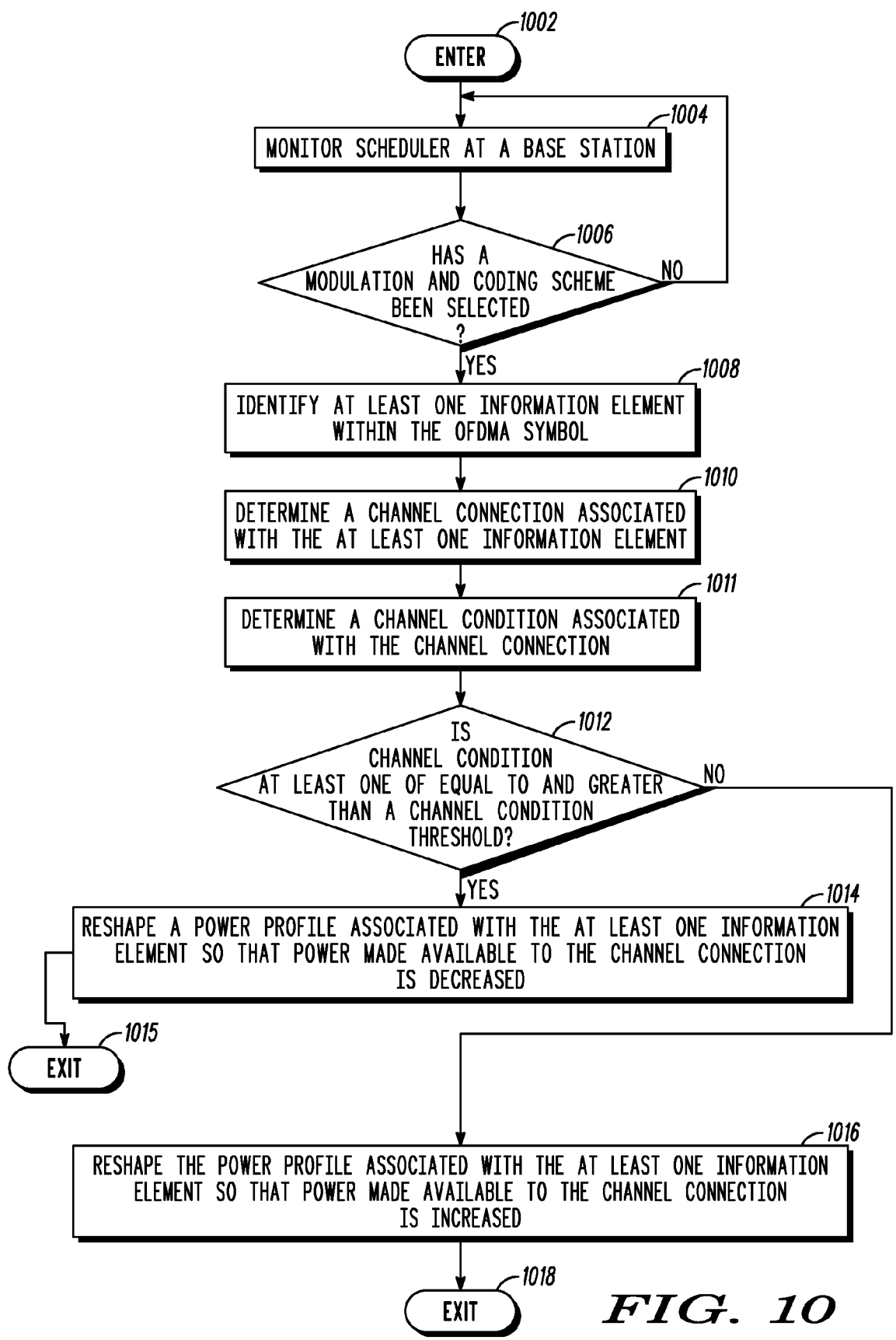
FIG. 10 is an operational flow diagram illustrating a process of reshaping power profiles for information elements within an OFDMA symbol according to another embodiment of the present invention.

FIG. 10 is an operational flow diagram illustrating a process whereby a power reshaping profile module 120, 122 reshapes a power profile for an OFDMA symbol according to another embodiment of the present invention. The operational flow diagram of FIG. 10 begins at step 1002 and flows directly to step 1004. The power profile reshaping module 122, at step 1004, monitors a scheduler at a base station for a modulation and coding scheme selection.

The power profile reshaping module 122, at step 1006, determines if a modulation and coding scheme has been selected. If the result of this determination is negative, the power profile reshaping module 122 returns to step 1004 and continues to monitor for a modulation and coding scheme selection. If the result of this determination is positive, power profile reshaping module 122, at step 1008, identifies at least one information element within the OFDMA symbol. The power profile reshaping module 122, at step 1010, determines a channel connection associated with the at least one information element. The power profile reshaping module 122, at step 1011, determines a channel condition associated with the channel connection.

The power profile reshaping module 122, at step 1012, determines if the channel condition is at least one of equal to and greater than a channel condition threshold. If the result of the determination at step 1012 is positive, the power profile reshaping module 122, at step 1014, reshapes a power profile associated with the at least one information element. The reshaping decreases power made available to the channel connection. For example, the reshaping may provides only a quantity of power necessary for the channel connection to receive the at least one information element. The operational flow diagram then ends at step 1015. If the result of the determination at step 1012 is negative (e.g., the channel condition is less than a channel condition threshold), the power profile reshaping module 122, at step 1016, reshapes a power profile associated with the at least one information element so that power made available to the channel connection is increased. The reshaping further may redistribute power saved from decreasing the power made available to the channel connection with the channel condition above the channel condition threshold thereby increasing a Signal to Noise Ratio associated with the channel connection such that a Bit Error Rate is improved. The operational flow diagram then ends at step 1018.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for reshaping power profiles in Orthogonal Frequency Division Multiple Access (OFDMA) symbols, the method comprising:

monitoring a scheduler at a base station for a modulation and coding scheme selection;

determining that the scheduler selected a modulation and coding scheme;

identifying at least one information element within the OFDMA symbol for associated power profile reshaping;

determining, in response to the identifying, a channel connection associated with the at least one information element;

determining a channel condition associated with the channel connection;

reshaping, in response to the channel condition being at least one of equal to and greater than a threshold associated with the channel condition, a power profile associated with the at least one information element, wherein the reshaping decreases power made available to the channel connection; and reshaping, in response to the channel condition being less than the channel condition threshold, the power profile associated with the at least one information element, wherein the reshaping increases power made available to the channel connection.

2. The method of claim 1, wherein the reshaping in response to the channel condition being at least one of equal to and greater than a channel condition threshold provides only a quantity of power necessary for the channel connection to receive the at least one information element.

3. The method of claim 1, wherein the reshaping in response to the channel condition being less than the channel condition threshold redistributes power saved from decreasing the power made available to the channel connection with the channel condition above the channel condition threshold thereby increasing a Signal to Noise Ratio associated with the channel connection such that a Bit Error Rate is improved.

4. The method of claim 1, further comprising:

determining a total number of OFDMA symbols that are occupied by a down-link map and an up-link map.

5. The method of claim 1, further comprising:

determining a total number of information elements within the OFDMA symbol.

6. An information processing system for reshaping power profiles in Orthogonal Frequency Division Multiple Access (OFDMA) symbols, the information processing system comprising:

a processor;

a memory communicatively coupled to the processor that comprises a power profile reshaping module executable by the processor, wherein the power profile reshaping module is adapted to:

monitor a scheduler at a base station for a modulation and coding scheme selection;

determine that the scheduler selected a modulation and coding scheme;

identify at least one information element within the OFDMA symbol for associated power profile reshaping;

determine, in response to the identifying, a channel connection associated with the at least one information element;

determine a channel condition associated with the channel connection;

reshape, in response to the channel condition being at least one of equal to and greater than a threshold associated with the channel condition, a power profile associated with the at least one information element, wherein the reshaping decreases power made available to the channel connection; and reshape, in response to the channel condition being less than the channel condition threshold, the power profile associated with the at least one information element, wherein the reshaping increases power made available to the channel connection.

7. The information processing system of claim 6, wherein the reshaping in response to the channel condition being at least one of equal to and greater than a channel condition threshold provides only a quantity of power necessary for the channel connection to receive the at least one information element.

8. The information processing system of claim 6, wherein the reshaping in response to the channel condition being less than the channel condition threshold redistributes power saved from decreasing the power made available to the channel connection with the channel condition above the channel condition threshold thereby increasing a Signal to Noise Ratio associated with the channel connection such that a Bit Error Rate is improved.

9. The information processing system of claim 6, further comprising:

determining a total number of OFDMA symbols that are occupied by a down-link map and an up-link map.

10. The information processing system of claim 6, further comprising:

Determining a total number of information elements within the OFDMA symbol.

11. A base station in a wireless communications system for reshaping power profiles in Orthogonal Frequency Division Multiple Access (OFDMA) symbols, the base station comprising the information processing system of claim 6.

12. The base station of claim 11, wherein the reshaping in response to the channel condition being at least one of equal to and greater than a channel condition threshold provides only a quantity of power necessary for the channel connection to receive the at least one information element.

13. The base station of claim 11, wherein the reshaping in response to the channel condition being less than the channel condition threshold redistributes power saved from decreasing the power made available to the channel connection with the channel condition above the channel condition threshold thereby increasing a Signal to Noise Ratio associated with the channel connection such that a Bit Error Rate is improved.

14. The base station of claim 11, wherein the power profile reshaping is further adapted to:

determining a total number of OFDMA symbols that are occupied by a down-link map and an up-link map.

15. The base station of claim 11, wherein the power profile reshaping is further adapted to:

determining a total number of information elements within the OFDMA symbol.

16. A site controller in a wireless communications system for reshaping power profiles in Orthogonal Frequency Division Multiple Access (OFDMA) symbols, the site controller comprising the information processing system of claim 6.

17. An information processing system for reshaping power profiles in Orthogonal Frequency Division Multiple Access (OFDMA) symbols, the information processing system comprising:

a memory;

a processor communicatively coupled to the processor; and a power profile reshaping module communicatively coupled to the memory and the processor, wherein the power profile reshaping module is adapted to:

monitor a scheduler at a base station for a modulation and coding scheme selection;

determine that the scheduler selected a modulation and coding scheme;

identify at least one information element within the OFDMA symbol for associated power profile reshaping;

determine, in response to the identifying, a channel connection associated with the at least one information element;

determine a channel condition associated with the channel connection;

reshape, in response to the channel condition being at least one of equal to and greater than a threshold associated with the channel condition, a power profile associated with the at least one information element, wherein the reshaping decreases power made available to the channel connection; and reshaping, in response to the channel condition being less than the channel condition threshold, the power profile associated with the at least one information element, wherein the reshaping increases power made available to the channel connection.

18. A base station in a wireless communications system for reshaping power profiles in Orthogonal Frequency Division Multiple Access (OFDMA) symbols, the base station comprising the information processing system of claim 17.

19. A site controller in a wireless communications system for reshaping power profiles in Orthogonal Frequency Division Multiple Access (OFDMA) symbols, the site controller comprising the information processing system of claim 17.

* * * * *